(12) United States Patent
Donze et al.

(10) Patent No.: US 11,937,713 B2
(45) Date of Patent: Mar. 26, 2024

(54) CONTAINER WITH EFFERVESCENT ACTION

(71) Applicant: ARC FRANCE, Arques (FR)

(72) Inventors: Sebastien Donze, Arques (FR); Yvan Garnier, Arques (FR); Emilie Debout, Arques (FR)

(73) Assignee: ARC FRANCE, Arques (FR)

( * ) Notice: Subject to any disclaimer, the term of this patent is extended or adjusted under 35 U.S.C. 154(b) by 736 days.

(21) Appl. No.: 17/057,905

(22) PCT Filed: May 21, 2019

(86) PCT No.: PCT/EP2019/063066
§ 371 (c)(1),
(2) Date: Nov. 23, 2020

(87) PCT Pub. No.: WO2019/224183
PCT Pub. Date: Nov. 28, 2019

(65) Prior Publication Data
US 2021/0204729 A1    Jul. 8, 2021

(30) Foreign Application Priority Data

May 24, 2018 (FR) ...................................... 1854421

(51) Int. Cl.
*A47G 19/22*    (2006.01)
*C03C 17/00*    (2006.01)
*C03C 17/04*    (2006.01)

(52) U.S. Cl.
CPC ........ *A47G 19/2233* (2013.01); *C03C 17/004* (2013.01); *C03C 17/04* (2013.01); *C03C 2217/70* (2013.01); *C03C 2218/32* (2013.01)

(58) Field of Classification Search
CPC . C03C 17/0004; C03C 2217/70; C03C 17/04; A47G 19/2233
USPC ........................................ 428/34.5
See application file for complete search history.

(56) References Cited

U.S. PATENT DOCUMENTS

| | | |
|---|---|---|
| 4,322,008 A | 3/1982 | Schneider |
| 7,845,525 B2 | 12/2010 | Lantz et al. |
| 2009/0226648 A1 | 9/2009 | Wild et al. |

FOREIGN PATENT DOCUMENTS

| | | |
|---|---|---|
| CN | 101274688 A | 10/2008 |
| CN | 102362761 A | 2/2012 |

(Continued)

OTHER PUBLICATIONS

Machine-assisted translation of FR 3008295A1, published Jan. 16, 2015; retrieved from ESPACENET on Sep. 24, 2023. (Year: 2015).*

(Continued)

*Primary Examiner* — Fred M Teskin
(74) *Attorney, Agent, or Firm* — Volpe Koenig

(57) ABSTRACT

The invention relates to a container (1) made of glass or stoneware for a beverage having surface irregularities in a chosen region, the irregularities forming nucleation sites inside the container, the nucleation sites favouring the formation of bubbles in contact with a carbonated beverage, comprising a layer of enamel (10) coating the chosen region, a plurality of enamel grains (12) arranged on the surface of said layer of enamel (10) and attached to said layer of enamel (10), and a hydrophobic compound (13) arranged on a portion of the surface of said enamel grains (12).

10 Claims, 3 Drawing Sheets

(56) References Cited

FOREIGN PATENT DOCUMENTS

| | | |
|---|---|---|
| DE | 3227303 A1 | 2/1984 |
| EP | 0703743 B1 | 5/1998 |
| EP | 2823736 A1 | 1/2015 |
| FR | 2531891 A1 | 2/1984 |
| FR | 2639812 A1 | 6/1990 |
| FR | 2641960 A1 | 7/1990 |
| FR | 3008295 A1 | 1/2015 |
| GB | 1421680 A | 1/1976 |
| GB | 2136679 A | 9/1984 |
| GB | 2258802 B | 5/1995 |
| RU | 94425 U1 | 5/2010 |
| WO | 9412083 A1 | 6/1994 |
| WO | 9638350 A1 | 12/1996 |
| WO | 2010048488 A1 | 4/2010 |

OTHER PUBLICATIONS

Liger-Belair, G. "The physics behind the fizz in champagne and sparkling wines" European Physical Journal: Special Topics 201, 1-88, 2012.

Liger-Belair, G. "La physique des bulles de champagne" Annales de Physique (Paris) 27 (4), 1-106, 2002.

Liger-Belair, G.; Conreux, A.; Villaume, S.; Cilindre, C. "Monitoring the losses of dissolved carbon dioxide from laser-etched champagne glasses" Food Research International, 54, 516-522, 2013.

Liger-Belair, G.; Voisin, C.; Jeandet, P. "Modeling non-classical heterogeneous bubble nucleation from cellulose fibers: Application to bubbling in carbonated beverages" Journal of Physical Chemistry B 109, 14573-14580, 2005.

Liger-Belair, G.; Parmentier, M.; Jeandet, P. "Modeling the kinetics of bubble nucleation in champagne and carbonated beverages" Journalof Physical Chemistry B 110, 21145-21151, 2006.

Liger-Belair, G. "How many bubbles in your glass of bubbly?" Journal of Physical Chemistry B 118, 3156-3163, 2014.

Liger-Belair, G.; Bourget, M.; Villaume, S.; Jeandet, P.; Pron, H.; Polidori, G. "On the losses of dissolved CO2 during champagne serving" Journal of Agricultural and Food Chemistry 58, 8768-8775, 2010.

* cited by examiner

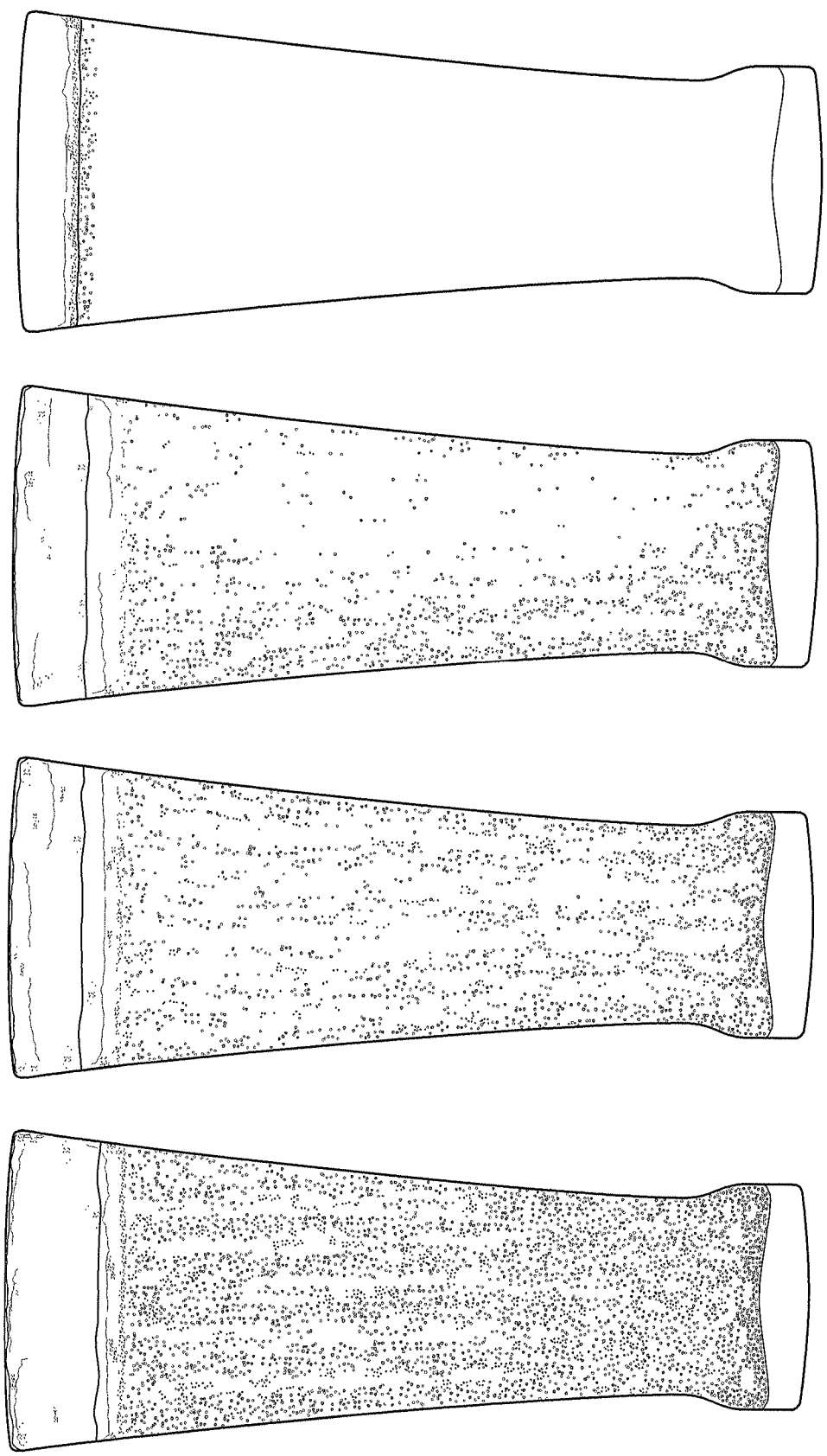

CONTAINER WITH EFFERVESCENT ACTION

INVENTIVE FIELD

The invention relates to the field of liquid containers, and more particularly to glassware.

BACKGROUND

In the manufacture of beverage containers such as glasses, the surfaces are generally made as smooth as possible, in particular to impart good transparency and for aesthetic reasons.

Serving a carbonated beverage in a container generates effervescent phenomena, or bubbling, and accumulation of foam on the surface. For serving beer or sparkling wine, for example, it is desirable to generate and maintain effervescence. The regions of genesis of the bubbles in a glass are referred to as nucleation sites.

It has been found that the presence of irregularities in the container surfaces in contact with the carbonated beverage promotes the occurrence of bubbles from the gas dissolved in said carbonated beverage. In order to promote the bubbling, inner surfaces with rough relief have thus been created in containers. When the container is filled with a carbonated liquid such as a carbonated beverage, the hollows of the inner surface trap air pockets. The interfaces between the liquid and the air pockets allow for better gas exchanges. The hollows then form nucleation zones.

European patent EP 0 703 743 of Charles Glassware describes a method for delivering material to a surface to create nucleation sites and improve bubbling. Sometimes, browning at the bottom of the glass has been observed. Patent application FR 2 531 891 describes a method for ablating material that promotes the appearance of gas release zones. Usage examples are given in international application WO 2010/048488.

Patent FR 3 008 295 proposes to create nucleation sites inside a beverage container by surface irregularities in a chosen region of the container on which a hydrophobic layer is then deposited on the chosen region.

The FR application No. 1753464 will be published after the filing date of the present invention.

The Applicant has identified the need to further improve the quality of the bubbling in order to meet the requirements of wider markets with low alcohol and/or low dissolved carbon dioxide types of beer. The quality of the bubbling encompasses the consistency of the bubbling and therefore the reproducibility of the manufacture of the container. Easy manufacture has been sought.

Professor Liger-Belair and his UMR CNRS 7331-University of Reims Champagne-Ardenne team published on effervescence:

Liger-Belair, G., "The physics behind the fizz in champagne and sparkling wines," European Physical Journal: Special Topics 201, 1-88, 2012.

Liger-Belair, G., "La physique des bulles de champagne" (English: The physics of champagne bubbles) Annales de Physique (Paris) 27 (4), 1-106, 2002.

Liger-Belair, G.; Conreux, A.; Villaume, S; Cilindre, C., "Monitoring the losses of dissolved carbon dioxide from laser-etched champagne glasses," Food Research International, 54, 516-522, 2013.

Liger-Belair, G.; Voisin, C.; Jeandet, P., "Modeling non-classical heterogeneous bubble nucleation from cellulose fibers: Application to bubbling in carbonated beverages," Journal of Physical Chemistry B 109, 14573-14580, 2005.

Liger-Belair, G.; Parmentier, M.; Jeandet, P., "Modeling the kinetics of bubble nucleation in champagne and carbonated beverages," Journal of Physical Chemistry B 110, 21145-21151, 2006.

Liger-Belair, G., "How many bubbles in you glass of bubbly," Journal of Physical Chemistry B 118, 3156-3163, 2014.

Liger-Belair, G.; Bourget, M.; Villaume, S.; Jeandet, P.; Pron, H.; Polidori, G., "On the losses of dissolved $CO_2$ during champagne serving," Journal of Agricultural and Food Chemistry 58, 8768-8775, 2010.

It is desirable to have a beer consumption container ensuring satisfactory bubbling for a large number of types of beer that it might contain, and stable during the uses of the container, whether the container is dry, or wet, in particular upon coming out of a dishwasher or during a second filling, with the achievement of equivalent bubbling.

The invention improves the situation, in particular with respect to the last two aforementioned patents of the Applicant.

SUMMARY

The Applicant proposes a beverage container made from glass or stoneware having surface irregularities in a chosen region. The irregularities form nucleation sites within the container, the nucleation sites promoting bubble formation when in contact with a carbonated beverage. The container comprises an enamel layer coating the chosen region, a plurality of enamel grains arranged at the surface of said enamel layer and attached to said enamel layer, and a hydrophobic compound arranged on a portion of the surface of said enamel grains.

The enamel grains coated with the hydrophobic coating associated with the enamel layer on which they are attached form nucleation sites. The resistance to dishwashers is excellent, in particular greater than 500 cycles in a dishwashing machine, with conservation of bubbling on the container whether dry or wet.

In one embodiment, said enamel layer has a melting temperature lower than the melting temperature of the enamel grains. The enamel grains retain at least in part the shape that they had prior to attachment to said enamel layer.

In one embodiment, said enamel layer has a thickness of between 5 and 100 µm, preferably between 10 and 25 µm. Below 5 µm there is a risk of attaching an insufficient number of enamel grains, in particular an insufficient surface density of enamel grains. Above 100 µm, certain enamel grains can be sunk excessively into said enamel layer. The preferred range of 10 to 25 µm results in a low level of unattached enamel grains, and in a roughness promoting bubbling.

In one embodiment, said enamel grains have a particle size distribution of between 1 and 500 µm, more preferably between 50 and 250 µm. Below 1 µm, the handling of the enamel grains is difficult and the surface thereof covered by the hydrophobic layer is less resistant to the dishwasher. Above 500 µm, some of the bubbles stagnate at the bottom of the container. Less foam is therefore provided. The appearance of the container diverges from those used for carbonated beverages, in particular due to roughness visible to the naked eye. The preferred range of 50 to 250 µm results in a proper surface density of enamel grains and a percentage of the region covered by the enamel grains that is good for bubbling.

In one embodiment, said enamel grains have a particle size such that D10 is between 30 and 90 μm, D10 being the diameter below which are 10% of the grains by volume, D50 is between 100 and 145 μm, D50 being the diameter below which are 50% of the grains by volume, and D90 is between 150 and 250 μm, D90 being the diameter below which are 90% of the grains by volume. The proportion of fine grains and the proportion of coarse grains is small. The observed attachment is good in quality and durable.

In one embodiment, D10 is between 35 and 50 μm, D50 is between 105 and 120 μm and D90 is between 160 and 190 μm. The loss of enamel grains during attachment is reduced.

In one embodiment, said enamel grains have a particle size distribution with a peak of between 80 and 200 μm, preferably between 100 and 130 μm. The peak is unique. The roughness provides satisfactory bubbling.

In one embodiment, the container is made of soda-lime glass.

In one embodiment, the container is made of crystalline material. The crystalline material comprises a sum of PbO, BaO, $K_2O$ and ZnO greater than or equal to 10% by mass.

In one embodiment, the hydrophobic compound comprises Si. The hydrophobic compound is resistant to more than 600° C.

In one embodiment, the enamel of the enamel grains is substantially free of Pb, preferably without deliberate addition of Pb. The enamel grains have high hardness and a high melting point.

The Applicant proposes a method for manufacturing beverage container glass having surface irregularities in a chosen region, wherein the irregularities form nucleation sites inside the container, the nucleation sites promoting bubble formation upon contact with a carbonated beverage, comprises depositing an enamel coating layer on the chosen region, and then depositing a plurality of enamel grains on the surface of said enamel layer, and cooking said enamel layer and attaching the enamel grains to said enamel layer by a same heat treatment, the enamel grains having a hydrophobic compound arranged on a portion of the surface of said enamel grains.

In one embodiment, the maximum temperature reached during the heat treatment is between the melting temperature of the enamel layer and the melting temperature of said enamel grains. The maximum temperature reached may be equal to 700° C.

In one embodiment, the enamel grains are refractory frosting.

In one embodiment, raw enamel grains are mixed with polysilazane, the mixture is cooked providing a solid body, and the solid body is broken to substantially recover the particle size of the original enamel grains. Here, "raw" means free of hydrophobic compound.

In one embodiment, the mixture of raw enamel grains and polysilazane is carried out in a proportion of between 8/1 and 15/1.

In one embodiment, the mixture is cooked at a temperature between 150° C. and 200° C. for a period of between 30 and 150 minutes.

In one embodiment, the solid body is broken by grinding. The grinding makes it possible to deagglomerate the solid body. The pre-cooking can cause agglomeration into a block solid body.

In one embodiment, the ground material is passed through at least one sieve. The particle size is controlled.

In one embodiment, the ground material, preferably sieved, is applied to the enamel layer.

In one embodiment, the application of the ground material to the enamel layer is performed by pad printing. A tempering step is carried out.

In one embodiment, the hydrophobic compound is obtained from polysilazane.

The container may further include a glass body. Transparency allows viewing of the appearance and path of bubbles from the nucleation site to the surface of the beverage.

BRIEF DESCRIPTION OF THE DRAWINGS

Other features, details and advantages of the invention will become apparent on reading the following detailed description, and from the appended drawings, in which:

FIG. 5 is a comparative photograph of one mode of the invention and of a glass provided only with the enamel layer.

DETAILED DESCRIPTION OF THE PREFERRED EMBODIMENTS

Figure 1:
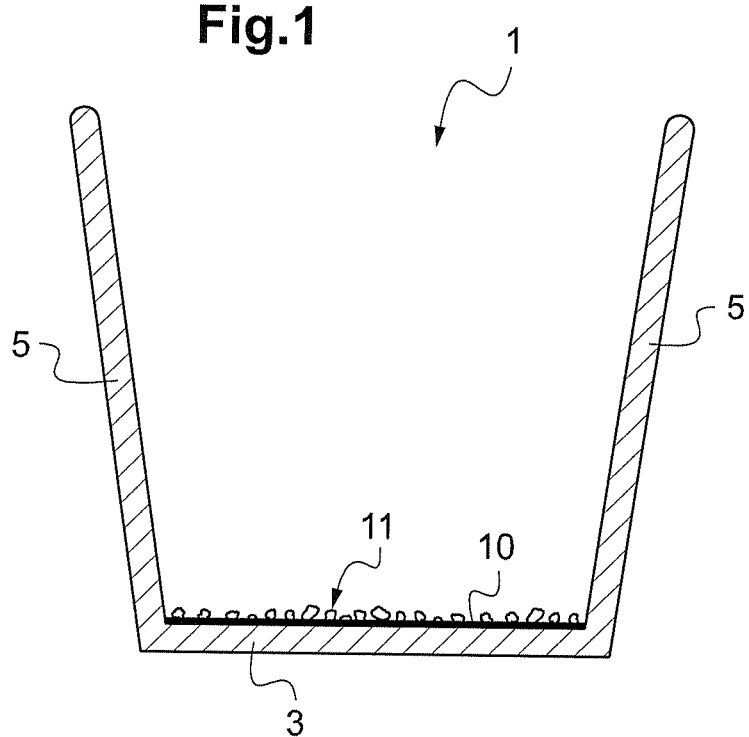
FIG. 1 is a sectional view of a container.
Figure 2:
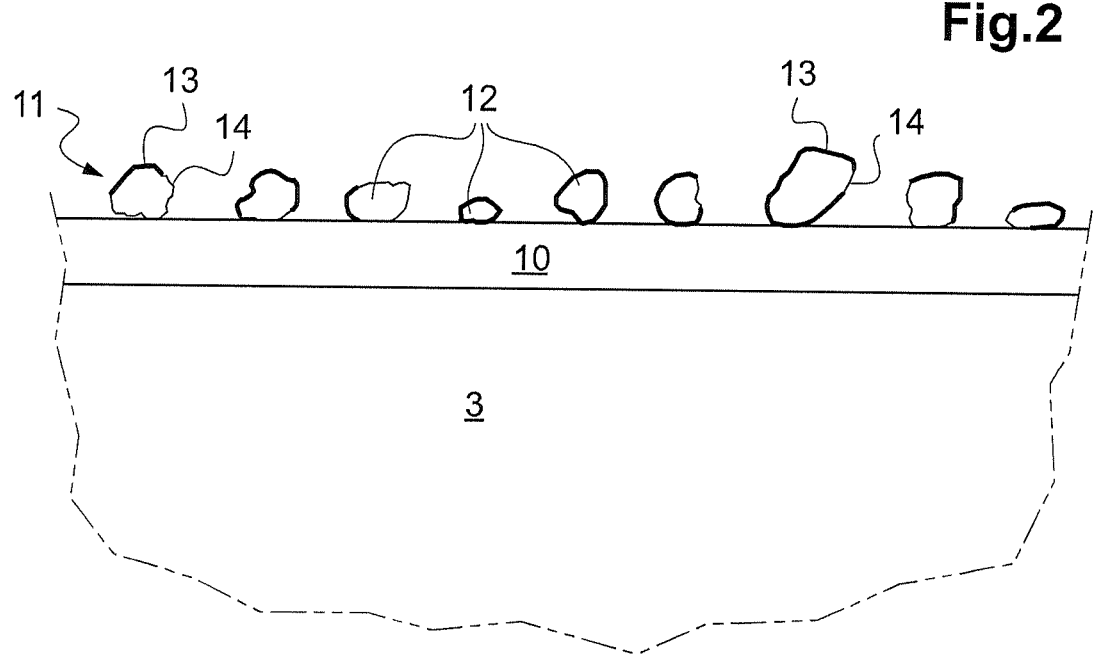
FIG. 2 is a detailed view of FIG. 1.

The drawings and the description hereinafter substantially contain elements of a certain nature. They can therefore not only serve to better understand the present invention, but also contribute to the definition thereof, where appropriate.

In a liquid food, the carbon dioxide ($CO_2$) dissolved in the liquid phase is the carrier gas of the effervescence phenomenon. The frequency of emission of the bubbles during a tasting, the enlargement of the bubbles in the container and the number of bubbles capable of forming are connected to a number of physical and chemical parameters of the liquid phase and of the container in which it is tasted.

When a gas is brought into contact with a liquid, a portion of the gas dissolves in the liquid. Different factors influence the solubility of the gas in the liquid, in particular temperature and pressure. In equilibrium, there is a proportionality between the concentration in the liquid phase of a chemical species i, denoted as Ci, and its gas phase partial pressure Pi. Henry's law is written:

$$Ci = k_H P_i \quad [1]$$

The proportionality constant $k_H$ is Henry's law's constant. It strongly depends on the gas and liquid in question, as well as temperature.

Under normal atmospheric pressure $P_o \approx 1$ bar, considering the solubility of $CO_2$ in a 4° C. beer which is equal to $k_H \approx 2.6$ g/L/bar, said beer is capable of dissolving about 2.6 g/L of $CO_2$.

When a chemical substance i is balanced across a gas/liquid interface, its concentration in the liquid verifies Henry's law. The liquid is then said to be saturated with respect to said substance. In such case, saturation means equilibrium.

When the concentration $c_L$ of a chemical substance i in a liquid is greater than what is provided by Henry's law, the liquid is supersaturated with respect to this substance. In order to quantify this out-of-equilibrium situation, the supersaturation coefficient Si is defined as the relative excess of concentration in a liquid of a substance i with respect to the reference concentration, denoted as co (selected as the equilibrium concentration of this substance under a partial pressure equal to the pressure in the liquid PL). The supersaturation coefficient Si is thus defined as follows:

$$S_i=(c_i-c_0)/c_0 \quad [2]$$

When a liquid is supersaturated with respect to a chemical substance, it is determined that Si>0. The liquid discharges a portion of the content thereof into this chemical substance to find a new equilibrium state that verifies Henry's law.

Under tasting conditions, in a container, the pressure in the liquid is substantially the same as the ambient pressure. Taking into account the low liquid height which does not exceed 20 cm to 25 cm, the effect of the hydrostatic pressure prevailing at the bottom of the container is negligible with respect to atmospheric pressure. At a temperature of 4° C., it is then possible to deduce therefrom the equilibrium concentration as equal to:

$$c_0 = k_H P_L \approx k_H P_0 \approx 2.6 \text{ g/L} \quad [3]$$

Beers do not all have the same dissolved $CO_2$ concentration. Some are weakly loaded at 3-4 g/l, while others are heavily loaded, up to 7-8 g/l their respective supersaturation coefficients with regard to dissolved $CO_2$ is not the same. In the case of an average beer, loaded at about 5 g/l, its supersaturation coefficient (at 4° C.) by applying the equation [2] is:

$$SCO_2=(c_i-c_0)/c_0 \approx (5-2.6)/2.6 \approx 0.9 \quad [4]$$

For comparison (still at 4° C.), the strongly carbonated waters (such Badoit Rouge) have supersaturation coefficients of around 1.3, whereas (young) Champagne wines have significantly higher coefficients, of around 3.4. In a general manner, the higher the supersaturation coefficient of a dissolved $CO_2$-laden liquid, the more intense the kinetics of the resulting escape of dissolved carbon dioxide in order to restore the balance of Henry's law. However, it has been observed that the supersaturation of a dissolved gas in a liquid does not necessarily result in the formation of bubbles and thus effervescence.

At the supersaturation values of beers, the formation of bubbles requires the presence of gas pockets in the medium, the radius of curvature $r_c$ of which exceeds a so-called critical value defined as follows:

$$r_c=2\gamma/P_0 S \quad [5]$$

where $\gamma$ is the surface tension of the liquid, Po is the ambient pressure and S is the supersaturation coefficient of the $CO_2$ liquid phase.

At the normal atmospheric pressure of 1 bar and at 4° C., in the case of a beer of which the surface tension is typically 45 mN/m and the supersaturation coefficient is approximately 0.9, the preceding equation shows a critical radius of about 1 µm below which the formation of bubbles does not occur.

In order to show and enlarge $CO_2$ bubbles in a beer, the medium contains gas microbubbles whose radii are greater than this critical radius of about 1 µm. This is referred to as non-conventional heterogeneous nucleation (as opposed to so-called conventional nucleations which relate to spontaneous formation, ex nihilo, of bubbles in a highly saturated liquid). Conventional nucleations require very large dissolved gas supersaturation coefficients (>100), incompatible with carbonated beverages.

The question of the origin of the gas germination points that are the catalysts of effervescence in a container then arises.

The Applicant has observed in situ, the mode of appearance of the beer bubbles in smooth glasses not having undergone any particular treatment. In the vast majority of cases, they are air pockets trapped in particles adsorbed on the surface of the glass that act as a nucleation site. The radius of these gas pockets trapped at the core of the particles (usually cellulose fibers) generally exceeds the critical radius required to allow diffusion of dissolved $CO_2$ and thus repetitive generation of bubbles in the glass.

The critical nucleation radius accounts for the concentration of dissolved $CO_2$ in the beer, see equations [4] and [5]. However, after being served, said concentration is no longer the same as that originally present. Service is a critical step. Pouring into the container generates significant turbulence that accelerates the escape of dissolved carbonic gas. The colder the beer, the more dissolved carbon dioxide is kept dissolved at the time of the service. The colder the beer, the more viscous it is. However, the lower the viscosity of the beer, the faster the rate of diffusion of dissolved $CO_2$. In addition, the more viscous the beer, the more effectively attenuated the turbulence of the pouring is. As a result, the colder the beer is served, the better the preservation of the carbon dioxide dissolved during service.

a. For St Omer Beer, served at 4° C., in a smooth glass, critical radii of 1.02±0.02 µm are found.

b. For Carlsberg Beer, served at 4° C., in a smooth glass, a critical radius of 1.05±0.02 µm is found.

Furthermore, it has been established that the flow of bubbles, i.e. the number of bubbles per second, is proportional to the square of the temperature, to the concentration of $CO_2$ dissolved in the liquid, and inversely proportional to the dynamic viscosity of the liquid (in kg/m/s).

In a container, according to one embodiment, filled with beer, a substantially preserved foam height has been found whether the container is dry at room temperature or wet at the temperature it comes out of the dishwasher.

Furthermore, the Applicant has conducted tests comparing a glass according to an embodiment and a glass according to FR 3 008 295. The two glasses have similar shapes: stemless glass, sometimes referred to as a cup, with a bottom thicker than the edge, of a height approximately three times greater than the diameter. This glass shape is found for Amstel®, Kronenbourg®, Heineken®, Fosters® and Carlsberg® brands, etc. Each dry glass at room temperature is filled with beer at 4-5° C. The beer is left for 10 minutes. Then, each glass is emptied, rinsed with clear water and placed in the same dishwasher.

Each clean glass is taken out of the washer and filled with the volume of the same Saint Omer® beer for which it is intended, in uninterrupted operation. The foam height is observed for 5 minutes after filling. As shown in FIG. 5, the height of foam in the glass provided only with the enamel layer arranged on the right is lower than for the glasses according to one embodiment. In the three glasses according to an embodiment arranged on the left, the foam height is satisfactory. In order from the left, a glass is shown after 300 washings, a glass after 100 washings and a fresh glass. The three foam heights are close to each other, which shows good resistance of the glass according to the invention to dishwashing.

The quality of the bubbling is observed. The foam is maintained for about 10 minutes.

The presence of the hydrophobic layer prevents water from filling the hollows and therefore allows the nucleation sites to function in the same manner as if the glass were dry.

What has been tested above with beers mainly loaded with carbon dioxide also applies to beers which are mainly loaded with nitrogen, such as Guinness® Draught, or served under nitrogen pressure.

One advantage is that the application of the hydrophobic layer is carried out on the enamel frosting, thus before the glass is involved. Interference with a conventional glass manufacturing process is reduced. In other words, a batch of coated enamel frosting can be prepared in advance and used for glasses of different shapes, different sizes, and for different beers.

Figure 3:
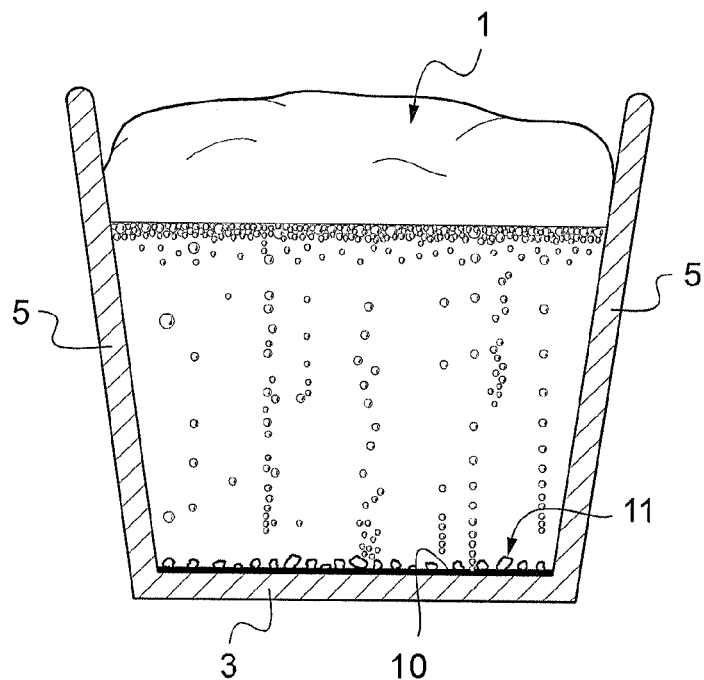
FIG. 3 is a view similar to FIG. 1 in the presence of a carbonated beverage.

Such a container 1 is shown in the figures. The container 1 here takes the form of a drinking glass. In some variations, the container 1 takes the form of a beer bottle, a champagne flute, or any other container adapted to receive a carbonated beverage. The method described in the following applies to most carbonated beverage containers for which the control of effervescence is of interest, see FIG. 3.

The container 1 here consists of a substantially planar bottom 3 and a lateral wall 5 of substantially tapered shape. The container 1 is, here, axisymmetric. In the example described here, the bottom 3 and the wall 5 form a single-piece body. The body has a bottom interior surface and an edge interior surface. The inner surfaces are intended to be in contact with the beverage when the container 1 is used.

The container 1 can be obtained by known manufacturing techniques as such, for example by pressing, blowing and/or by centrifugation. Upon output, the inside of the container 1 is substantially smooth and uniform. The container 1 is said to be raw.

In the example described below, the inner bottom surface 3 is coated with an enamel layer 10. Other parts may be coated on the basis of the desired location of the bubbles in the completed container 1, or else the bottom 3 may be coated only partially. The inner edge surface is generally uncoated.

In one embodiment, the enamel layer 10 is a refractory enamel. The enamel is substantially free of lead, more specifically free of deliberate addition of lead. The enamel of the enamel layer 10 may be according to FR 2 825 999 to which the reader is invited to refer.

Optionally, at most 4% of pigment by mass may be added to the mixture prior to tempering. It is possible, for example, to add an Iriodin® pigment made from mica and titanium oxide. A pigment comprising 51 to 58% of mica, 42 to 48% of $TiO_2$ and at most 1% of $SnO_2$ or 66 to 74% of mica, 26 to 33% of $TiO_2$, presence of possible iron oxide, and at most 1% of $SnO_2$ may be suitable. The presence of mica and titanium oxide in the form of very refractory small particles increases the roughness of the enamel layer 10.

The enamel layer 10 has a thickness of between 5 and 100 μm, preferably between 10 and 25 μm.

The enamel layer 10 adheres to the bottom inner surface 3. Adhesion is obtained by bringing the glass to a high temperature in a temperature environment between 600 and 700° C. The enamel layer 10 may have a transformation temperature range between 460 and 500° C., a softening temperature range of between 500 and 540° C., the softening temperature being higher than the transformation temperature.

An enamel frosting 11 is attached to the enamel layer 10. The enamel frosting 11 is granular. The enamel frosting 11 is deposited on the enamel layer 10, in particular by pad printing. A tempering causes the enamel layer 10 to soften and attaches the enamel frosting 11 to the enamel layer 10. A slight depression of the enamel frosting 11 into the enamel layer 10 is possible.

The enamel frosting 11 comprises enamel grains 12 coated with a hydrophobic layer 13. The enamel grains 12 are composed of an enamel more refractory than the enamel layer 10. The enamel grains 12 may consist of an enamel usually used to coat a food-grade ceramic, the enamel then being melted to form a transparent layer. The grain enamel may be provided by Ferro®. In contrast, according to the invention, the enamel of the grains is not melted. The shape of the enamel grains 12 is generally preserved. The granular character is maintained. The enamel grains 12 are carried for a treatment period at a treatment temperature lower than the temperature at which said enamel grains soften or adhere to each other for the same processing period.

The enamel frosting 11 may comprise, by mass: $SiO_2$ 40 to 60%, $Al_2O_3$ 2 to 6%, $B_2O_3$ 15 to 30%, $Li_2O$ 2 to 6%, $Na_2O$ 5 to 10%, $K_2O$ 2 to 6%, MgO less than 1%, CaO less than 1%, $ZrO_2$ 2 to 6%. Traces of other elements may be present.

Alternatively, the enamel frosting 11 may comprise, by mass: SiO2 40 to 60%, Al2O3 10% at the most, B2O3 15 to 40%, Li2O 2 to 6%, Na2O 10% at the most, K2O 6% at the most, MgO less than 1%, BaO 6% at the most, CaO 10% at the most, $ZrO_2$ 6% at the most, $La_2O_3$ 6% at the most, $F_2$ less than 2%. Traces of other elements may be present. More specifically, in a first embodiment, the enamel frosting 11 comprises by mass: $SiO_2$ 40 to 60%, $Al_2O_3$ 2 to 6%, $B_2O_3$ 15 to 30%, $Li_2O$ 2 to 6%, $Na_2O$ 5 to 10%, $K_2O$ 2 to 6%, MgO less than 1%, BaO no deliberate addition, CaO 1% at the most, $ZrO_2$ 2 to 6%, $La_2O_3$ not deliberate addition, F2 no deliberate addition.

In a second embodiment, the enamel frosting 11 comprises by mass $SiO_2$ 40 to 60%, $Al_2O_3$ 2% at the most, $B_2O_3$ 20 to 40%, $LiO_2$ 2 to 6%, $Na_2O$ 1% at the most, $K_2O$ 1% at the most, MgO no deliberate addition, BaO no deliberate addition, CaO 5% to 10%, $ZrO_2$ no deliberate addition, $La_2O_3$ no deliberate addition, $F_2$ no deliberate addition.

In a third embodiment, the enamel frosting 11 comprises by mass $SiO_2$ 40 to 60%, $Al_2O_3$ 5 to 10%, $B_2O_3$ 15 to 30%, $Li_2O$ 2 to 6%, $Na_2O$ 1 to 5%, $K_2O$ 2 to 6%, MgO less than 1%, BaO 2 to 6%, CaO less than 1%, $ZrO_2$ 2 to 6%, $La_2O_3$ 2 to 6%, $F_2$ less than 2%.

The transformation temperature range is between 450 and 550° C. The transformation temperature range is the passage of the glass from a viscoelastic state to a solid glassy state. The transformation temperature may be estimated with a dilatometer. The softening temperature range is between 600 and 680° C., more particularly between 640 and 650° C. The transformation temperature can be estimated by microscopy with a heating stage. The transformation temperature may be between 500 and 520° C.

The enamel frosting 11 is heated to a temperature substantially below the normal use temperature for enameling a ceramic piece. The tempering can be carried out at a temperature at which the enamel layer 10 is markedly softened, or fusion may even start while the enamel frosting 11 retains its shape by being away from its fusion point. The tempering can be carried out at a temperature between 600 and 700° C., for example 650° C.+/−20° C.

A spread of at least 20° C. can be provided between the softening temperatures or between the transformation temperatures of the enamel frosting 11 and the enamel layer 10, preferably a spread of at least 100° C. between the softening temperatures.

The hydrophobic layer 13 partially or even totally covers the enamel grains 12. The enamel grains 12 may have bare zones 14. The hydrophobic layer 13 contains polysilazane. A precursor is deposited on the enamel grains 12 while in powder form. The precursor may comprise Durazane® 1800 from Merck. The precursor is mixed with the enamel frosting in a mass proportion of about ¹/₁₀, especially ⅛ to ¹/₁₅. The precursor is then on the surface of the enamel grains of the enamel frosting. The mixture is heated to 150-200° C., for example 180° C. The baking can last 30 to 150 minutes, for example 1 hour. The cooking may take place in an oven. After cooking, the mixture is in the form of an agglomerated cake. The cake is ground. The grinding makes it possible to retrieve a pulverulent product. The enamel grains 12 are then covered with the hydrophobic layer 13, some completely, others in part.

The ground material is sieved to remove the unground parts and possible fines. The unground parts can be reground or recycled to an enamel production line. The fines may be recycled to an enamel production line. A 40 μm fine sieve, preferably 50 μm, and a 500 μm sieve, preferably 250 μm, may be provided. The sieved ground material may be prepared in advance. The sieved ground material is suitable for various containers, glass or stoneware.

The sieved ground material is applied to a chosen region of the container 1, generally the bottom of the container 1. It can be applied by pad printing. The container 1 is then passed through a tempering furnace. The tempering attaches the sieved ground material to the enamel layer 10. The ground material attached to the enamel layer 10 forms surface irregularities. The roughness obtained depends on the amount of enamel frosting, expressed by mass per unit area or number of grains per unit area, and the particle size of the enamel frosting. The hydrophobic layer is retained for tempering.

Figure 4:
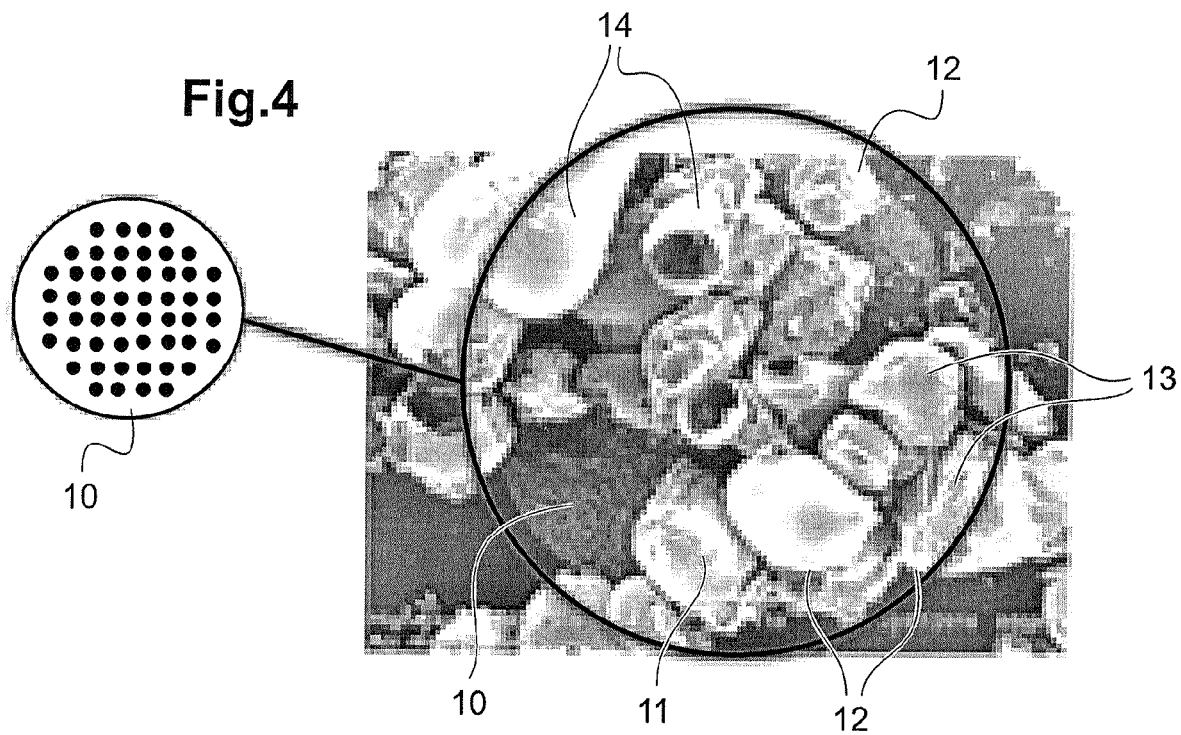
FIG. 4 is a top view with high magnification.

In FIG. 4, a sample of enamel layer 10, appearing in the background, was coated with enamel frosting 11. The hydrophobic and non-hydrophobic regions do not appear with the type of representation chosen. The magnification is around 100.

The surface irregularities form nucleation sites within the container, herein at the bottom 3. The nucleation sites promote the formation of bubbles upon contact with a carbonated and/or nitrogenated beverage.

On a glass thus treated, the bubbling of the beer in the dry state and the bubbling of the beer in the hot and humid state are almost identical. The invention applies in particular to containers made of soda-lime glass or of crystalline glass, in particular in crystalline form without deliberate addition of Pb. Such a crystal has, in general, a Pb content of less than 0.5% by mass.

The invention is not limited to the examples of methods and containers described above, only by way of example, but it encompasses all variants that the person skilled in the art can consider in the framework of the claims below.

The invention claimed is:

1. A container made of glass or stoneware for a beverage having surface irregularities in a chosen region, the irregularities forming nucleation sites inside the container, the nucleation sites promoting the formation of bubbles in contact with a carbonated beverage, the container comprising:
   an enamel layer coating the chosen region,
   a plurality of enamel grains arranged at the surface of said enamel layer and attached to said enamel layer, and
   a hydrophobic compound arranged on a part of the surface of said enamel grains.

2. The container according to claim 1, wherein said enamel layer has a melting temperature lower than the melting temperature of the enamel grains.

3. The container according to claim 1, wherein said enamel layer has a thickness of between 5 and 100 μm.

4. The container according to claim 1, wherein said enamel grains have a particle size distribution of between 1 and 500 μm.

5. The container according to claim 1, wherein said enamel grains have a particle size such that D10 is between 30 and 90 μm, D10 being the diameter below which are 10% of the grains by volume, D50 is between 100 and 145 μm, D50 being the diameter below which are 50% of the grains by volume, and D90 is between 150 and 250 μm, D90 being the diameter below which are 90% of the grains by volume.

6. The container according to claim 1, wherein said enamel grains have a particle size distribution having a peak of between 80 and 200 μm.

7. The container according to claim 1, wherein the container is made of soda-lime glass or crystalline glass.

8. The container according to claim 1, wherein the hydrophobic compound comprises Si and the enamel of the enamel grains is substantially free of Pb, without deliberate addition of Pb.

9. A method for manufacturing a beverage container having surface irregularities in a chosen region, the irregularities forming nucleation sites inside the container, the nucleation sites promoting the formation of bubbles in contact with a carbonated beverage, the method comprising:
   depositing an enamel layer coating the chosen region,
   depositing a plurality of enamel grains on the surface of said enamel layer, and
   cooking the enamel layer whereby the enamel grains are attached to said enamel layer by a same heat treatment, the enamel grains having a hydrophobic compound arranged on a part of the surface of said enamel grains.

10. The method according to claim 9, wherein the heat treatment is carried out at a temperature between a melting temperature of the enamel layer and a melting temperature of said enamel grains.

* * * * *